United States Patent
Williams (10) Patent No.: US 8,009,992 B2
(45) Date of Patent: Aug. 30, 2011

(54) OPTICAL INTERCONNECT

(75) Inventor: R. Stanley Williams, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1077 days.

(21) Appl. No.: 11/811,506

(22) Filed: Jun. 11, 2007

(65) Prior Publication Data

US 2008/0304832 A1  Dec. 11, 2008

(51) Int. Cl.
*H04B 10/00* (2006.01)

(52) U.S. Cl. ........ 398/131; 398/128; 398/164; 398/156; 398/136; 398/137; 385/14; 385/88; 385/89; 385/31; 385/129

(58) Field of Classification Search .................. 398/131, 398/135, 136, 137, 138, 139, 164, 128, 130, 398/129, 122, 118, 119, 120, 123, 127, 156, 398/182, 183, 192, 194, 195, 60, 158, 159, 398/162, 196, 197, 202, 209, 212, 213, 214, 398/79; 385/14, 15, 31, 129, 130, 131, 132, 385/88, 89, 90, 92, 93, 1, 2, 3, 4, 24
See application file for complete search history.

(56) References Cited

U.S. PATENT DOCUMENTS

| | | | |
|---|---|---|---|
| 4,878,002 A | 10/1989 | Heatzig et al. | |
| 4,892,376 A * | 1/1990 | Whitehouse | 398/164 |
| 5,101,460 A * | 3/1992 | Richard | 385/37 |
| 5,699,463 A | 12/1997 | Yang et al. | |
| 6,778,741 B2 | 8/2004 | Lefebvre | |
| 6,834,131 B2 | 12/2004 | Tourne | |
| 6,872,007 B2 | 3/2005 | Botham | |
| 6,961,501 B2 | 11/2005 | Matsuura et al. | |
| 7,024,086 B2 | 4/2006 | Tourne | |
| 2003/0006068 A1 | 1/2003 | Tourne | |
| 2003/0081281 A1* | 5/2003 | DeCusatis et al. | 359/124 |
| 2004/0057669 A1 | 3/2004 | Botham | |
| 2004/0208596 A1* | 10/2004 | Bringans et al. | 398/130 |
| 2005/0129349 A1 | 6/2005 | Tourne | |
| 2006/0165345 A1 | 7/2006 | Tourne | |
| 2009/0034985 A1* | 2/2009 | Fattal et al. | 398/164 |

FOREIGN PATENT DOCUMENTS

JP  2005-249919  9/2005
WO  WO 03/005616 A2  1/2003

* cited by examiner

*Primary Examiner* — Hanh Phan (57) ABSTRACT

An optical interconnect includes a translatable optical source; an optical modulator element disposed on a circuit board and configured to receive an optical beam from the optical source; and an optical receiver disposed on a circuit board and configured to receive a modulated optical beam from the modulator element.

18 Claims, 9 Drawing Sheets

OPTICAL INTERCONNECT

BACKGROUND

Light beams are frequently used as optical signals to transmit digital data over long distances, for example, in fiber optic systems for long-distance telephony and internet communication. In such systems, light beams are modulated as needed using various protocols to carry digital data. Pulsed optical beams may also be used for other purposes, including motion sensing, distance measurement, etc.

Consequently, optical technology plays a significant role in modern telecommunications and data acquisition. Examples of optical components used in such systems include optical or light sources such as light emitting diodes and lasers, waveguides, fiber optics, lenses and other optics, photo-detectors and other optical sensors, optically-sensitive semiconductors, optical modulators, and others.

Systems making use of optical components often rely upon the precise manipulation of optical energy, such as a beam of light, to accomplish a desired task. This is especially true in systems utilizing light for high-speed, low-energy communication between two nodes. The manipulation of an optical signal may include selectively encoding information on a light beam of the optical signal and directing the light beam of the optical signal to a sensor that detects the encoded light beam.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

As noted above, light or optical beams can be used for a variety of purposes, including the transmission of data. In some such systems, the optical beam is directed or redirected into an optical path where it can be detected or received by a designated component. However, when optical beams are used to communicate data between separate components, such as boards in a rack, correct alignment between the components may be important and difficult to achieve and maintain. Furthermore, it may be desirable to minimize optical impedance, interference, and/or distortion in such systems.

Circuit boards having electronic components are sometimes housed in a multi-board rack. In some cases, the transmission of data from one electronic component to another electronic component of the boards in the rack is required for the boards to function properly. To accomplish this task, an electrically conductive backplane may be provided that allows for interconnection, including electronic data paths, between circuit boards. However, this solution does not offer the higher data transmission bandwidth, shorter transmission latency, and lower power benefits of an optical transmission system between components. Therefore, it may be desirable to provide an optical interconnect system to facilitate inter-component data transmission in and between circuit boards.

One optical solution to providing data transmission between circuit board components includes using plastic waveguides to move optical data from an electronic component to the edge of a board on which it sits, coupling the data into an optical waveguide in the backplane of the rack, moving the data onto another waveguide on a second board, and finally conducting the data to an electronic component on the second board. In addition to waveguide fabrication costs and optical losses at waveguide junctions, this solution, in general. has a longer data path length, and thus greater latency, than direct free space optical data transmission between components. However, free space optical data transmission solutions often pose the problem of obtaining sufficient alignment between optical sources and receivers. Hence, it may further be desirable to provide a free space optical interconnect system for inter-component data transmission in circuit boards that is resistant to misalignment problems and can actively steer the optical beam to the point where the data is needed.

To accomplish these and other goals, the present specification discloses systems and methods relating to an optical interconnect having a translatable and steerable optical source disposed on a multi-board housing, an optical modulator element disposed on a board in the multi-board housing that is configured to receive an optical beam from the optical source, and a sensor configured to receive a modulated optical beam from the modulator element.

As used in the present specification and in the appended claims, the term "optical energy" refers to radiated energy having a wavelength generally between 10 nanometers and 500 microns. Optical energy as thus defined includes, but is not limited to, ultraviolet, visible, and infrared light. A beam of optical energy may be referred to herein as a "light beam" or "optical beam."

As used in the present specification and in the appended claims, the term "optical source" refers to a device from which optical energy originates. Examples of optical sources as thus defined include, but are not limited to, light emitting diodes, lasers, light bulbs, lamps and other light sources.

As used in the present specification and in the appended claims, the term "optical interconnect" refers broadly to a component that links portions of an optical pathway along which a light beam is propagating. The optical interconnect may guide or redirect the light beam so that the beam is incident on or reaches an optical component configured to receive the light beam. Consequently, with appropriate optical interconnects, an optical pathway can be configured with any length or shape as suits a particular application.

As used in the present specification and in the appended claims, the term "actuator" refers to an apparatus that impels an object to mechanical action or motion. Examples of actuators as thus defined include, but are not limited to, electric motors, piezoelectric devices, hydraulic arms, micro-electromechanical (MEMS) devices, and springs.

As used in the present specification and in the appended claims, the term "translatable" will be understood to refer to a component that can be moved or translated within a plane. This may include controlled motion in at least two dimensions. The term "steerable" will be understood to refer to a component that is both translatable and can also be selectively tilted to adjust its angle with respect to the plate in which it translates.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to exemplary optical interconnects and exemplary methods of utilizing the exemplary optical interconnects.

Exemplary Optical Interconnects

Figure 1:
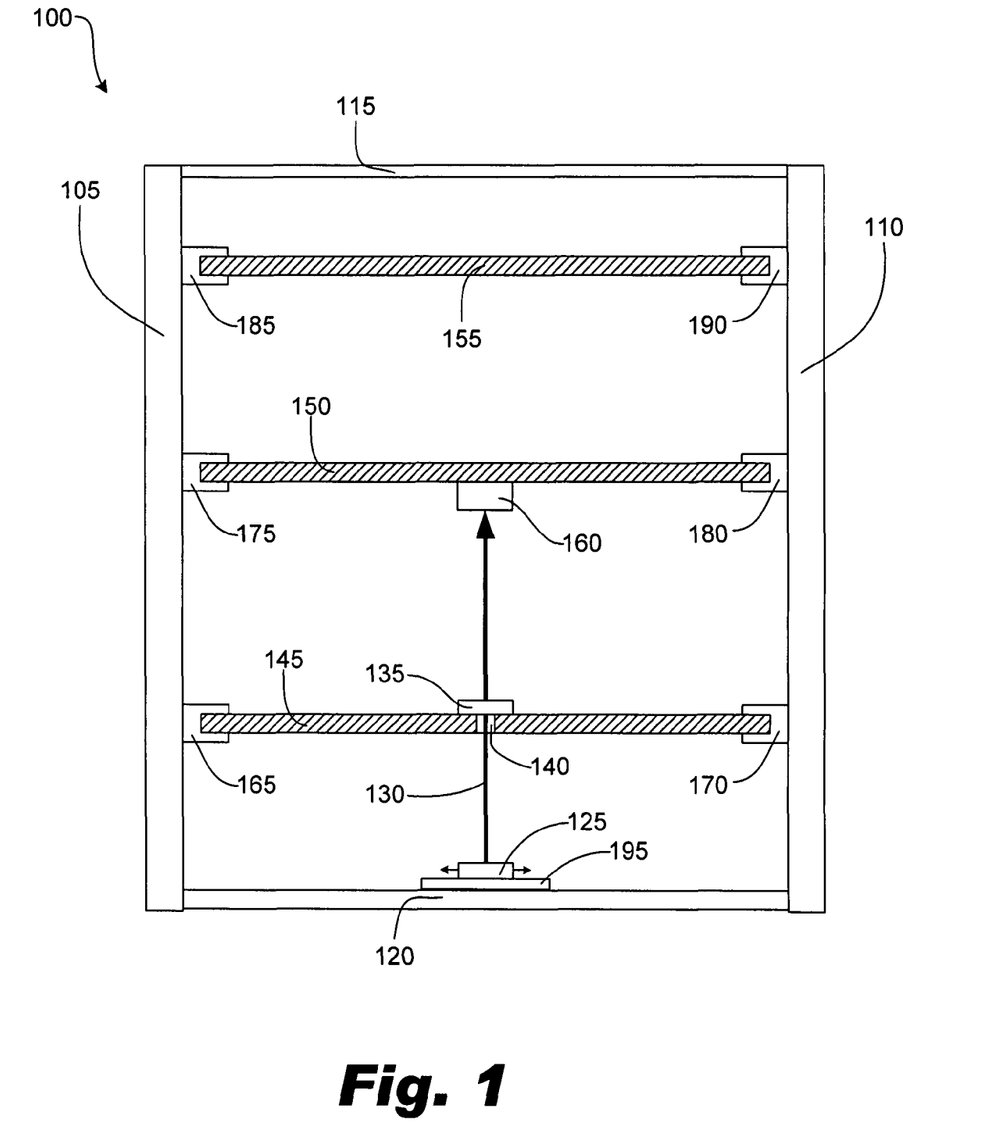
FIG. 1 is a top view of an electronics rack having an exemplary optical interconnect, according to principles described herein.

Referring now to FIG. 1, a top view of an exemplary electronics rack (100) having an exemplary optical interconnect is shown. The exemplary electronics rack (100) includes a number of panels (105, 110, 115, 120) that are configured to physically house a number of circuit boards, for example, first, second, and third circuit boards (145, 150, 155, respectively). In this particular view, a front panel (105), side panels (115, 120), and a back panel (110) of the rack (100) are shown. The rack (100) of the present embodiment may also include top and bottom panels (not shown). Any or all of the panels (105, 110, 115, 120) may be removable, especially the front and/or back panels (105, 110), to allow the insertion of a circuit board into the rack. The panels may include brackets (165, 170, 175, 180, 185, 190), which engage one side or opposing sides of the circuit boards (145, 150, 155) to secure the boards (145, 150, 155) to the rack (100) and provide electronic interconnects for the boards (145, 150, 155). The electronic interconnects may primarily provide electrical power to the boards (145, 150, 155).

The circuit boards (145, 150, 155) may include a variety of electrical components, such as processor chips and memory modules, some of which may require communication with other electrical components in order to perform their desired functions. In the present example, data transmission occurs from components of the first board (145) to components of the second board (160) through the exemplary optical interconnect.

The exemplary optical interconnect includes a translatable and steerable optical source (125) disposed on the side panel (120) of the electronics rack (100). The optical source is translatable along the side panel (120), as indicated by the arrows in FIG. 1, can be tilted for beam steering, and is configured to emit an optical beam (130) to a selectively transmissive or reflective modulator element (135) disposed on the first board (145). The first board (145) of the present embodiment has an opening (140) through which the optical beam (130) passes to the modulator element (135).

The modulator element (135) is selectively transmissive or reflective, meaning that the modulator element (134) can be controlled either transmit or reflect the light from the optical source (125). In some examples, the modulator element (135) includes an actuator and an opaque member that is moved by said actuator into and out of the beam of light to selectively reflect or block the beam of light so as to modulate data into the beam. In other examples, the modulator element (135) may be disposed in the path of the light beam, but selectively change is optical properties to transmit or block the beam of light so as to modulate data into the beam. In other words, data may be encoded in the optical beam (135) by selectively varying the optical transmissiveness or reflectivity of the modulator element (135), and in turn, selectively varying the intensity or brightness of the optical beam (130) emerging from the modulator element (135). Consequently, the optical beam (130) may be selectively passed through or reflected by the modulator element (135) so as to encode data in the optical beam (130).

An optical receiver (160) is disposed on the second board (150) and substantially aligned with the modulator element (135). The optical receiver (160) is configured to receive the modulated optical beam (130) emitted from the modulator element (135) and demodulate the information encoded in the optical beam (130).

The optical receiver (160) may be configured to output an electric signal representative of one or more aspects of the optical beam (130). For example, the optical receiver (160) may produce a data signal bearing data that has been encoded or modulated in the received light beam. In this way, data transmitted from components of the first board (145) may be received and utilized by components of the second board (150).

In some embodiments, the optical receiver (160) includes one or more photodiodes. In other embodiments, the optical receiver (160) may include, but is not limited to, one or more waveguides, fiber optic material, optical cable, optical sensors, lenses, semiconductors, and combinations thereof.

In the present embodiment, the optical receiver (160) is located on one side of the second board (150) and substantially aligned with the modulator element (135) so that the optical receiver (160) may receive the optical beam (130) directly from the modulator element (135). In some embodiments, the optical beam may pass through an opening in the second board (150) prior to reaching the optical receiver (160). In other embodiments, the optical beam (130) may be redirected or undergo additional manipulation and/or steering with additional optical interconnects, such as mirrors or lenses, and/or other optical apparatus, to direct the modulated beam to one or another target receiver.

The optical source (125) may include an actuator (195) configured to substantially align the optical source (125) with the modulator element (135) by translating the optical source (125) along the side panel (120) of the electronics rack (100). In various embodiments, the actuator (195) may be capable of adjusting the position or the angle of the optical source (125) with respect to the plane represented by the side panel (120). Readings from the modulator element and/or the optical receiver (160) may be used in a feedback loop in conjunction with the actuator to achieve an optimal alignment of the optical source (125) to the modulator element (135) and, in some embodiments, to the optical receiver (160).

In some embodiments, a number of optical sources may be disposed on a translatable, steerable actuator, similar to the optical source (125) shown, which may be disposed on the side panel (120) of the electronics rack (100) and configured to emit a number of optical beams to a number of modulator elements, which in turn encode data onto the optical beams and transmit the beams to a number of corresponding optical receivers. Each of the modulator elements and optical receivers may be disposed on the different circuit boards (145, 150, 155) according to specific data communication needs.

Moreover, in some embodiments, the optical source (125), modulator element (135), and optical receiver (160) may be disposed on the edges of the circuit boards (145, 150, 155) and need not rely on an intermediate circuit board opening (140) to transmit the optical beam (130) from the one circuit board to another.

Figure 2:
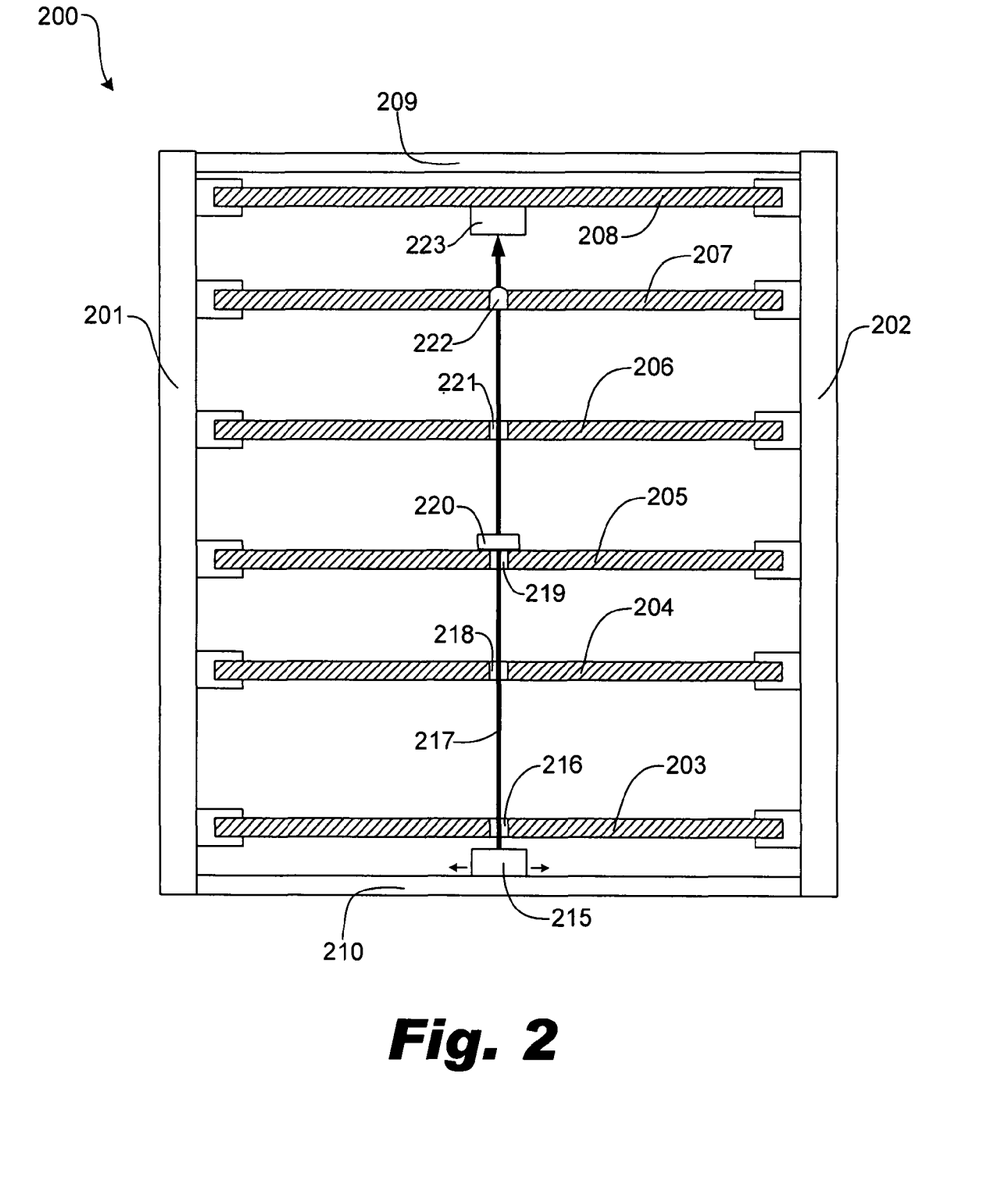
FIG. 2 is a top view of an electronics rack having an exemplary optical interconnect, according to principles described herein.

Referring now to FIG. 2, a cross-sectional side view of another exemplary electronics rack (200) is shown. The exemplary electronics rack (200) has a first side panel (209), two front and back panels (201, 202), and a second side panel (210), and is configured to house a number of circuit boards, for example, first, second, third, fourth, fifth, and sixth circuit boards (203, 204, 205, 206, 207, 208, respectively).

Similar to the example of FIG. 1, the circuit boards (203, 204, 205, 206, 207, 208) may each support a variety of electrical components, some of which may require communication with other electrical components in order to perform their desired functions. In the present example, data transmission occurs from components of the third board (205) to components of the sixth board (208) through the exemplary optical interconnect.

The exemplary optical interconnect includes a translatable optical and steerable source (215) disposed on the second side panel (210) of the exemplary rack (200). The optical source (215) is configured to produce an optical beam (217) that is received by a selectively transmissive or reflective modulator element (220) on the third board (205). Electronic components of the third board (205) selectively manipulate the optical beam (217) by selectively altering the transmissiveness or reflectivity of the modulator element (220) to encode data in the optical beam (217) that is to be transmitted to the sixth board (208). The modulated optical beam (217) is then received and decoded by an optical receiver (223) on the sixth board (208), according to principles of the present specification.

The first, second, and third circuit boards (203, 204, 205, respectively) each have substantially aligned openings (216, 218, 219) intermediate the translatable optical source (215) and the selectively transmissive or reflective modulator element (220). The translatable and steerable optical source (215) may have an actuator to selectively translate or tilt the optical source (215) such that the optical source (215) is substantially aligned with the modulator element (220) and the intermediate circuit board openings (216, 218, 219). As previously mentioned, feedback from the modulator element (220) and/or an optical receiver (223) may be used in conjunction with the actuator to achieve an optimal alignment of the optical source to the modulator element (220) and/or optical receiver (223).

Openings (221, 222) in the fourth and fifth circuit boards (206, 207) are intermediate and substantially aligned with the selectively transmissive or reflective modulator element (220) and the optical receiver (223). In the present embodiment, the opening (222) in the fifth circuit board (207) includes a lens configured to provide an optimal focus of the optical beam (217) on the optical receiver (223).

Figure 3:
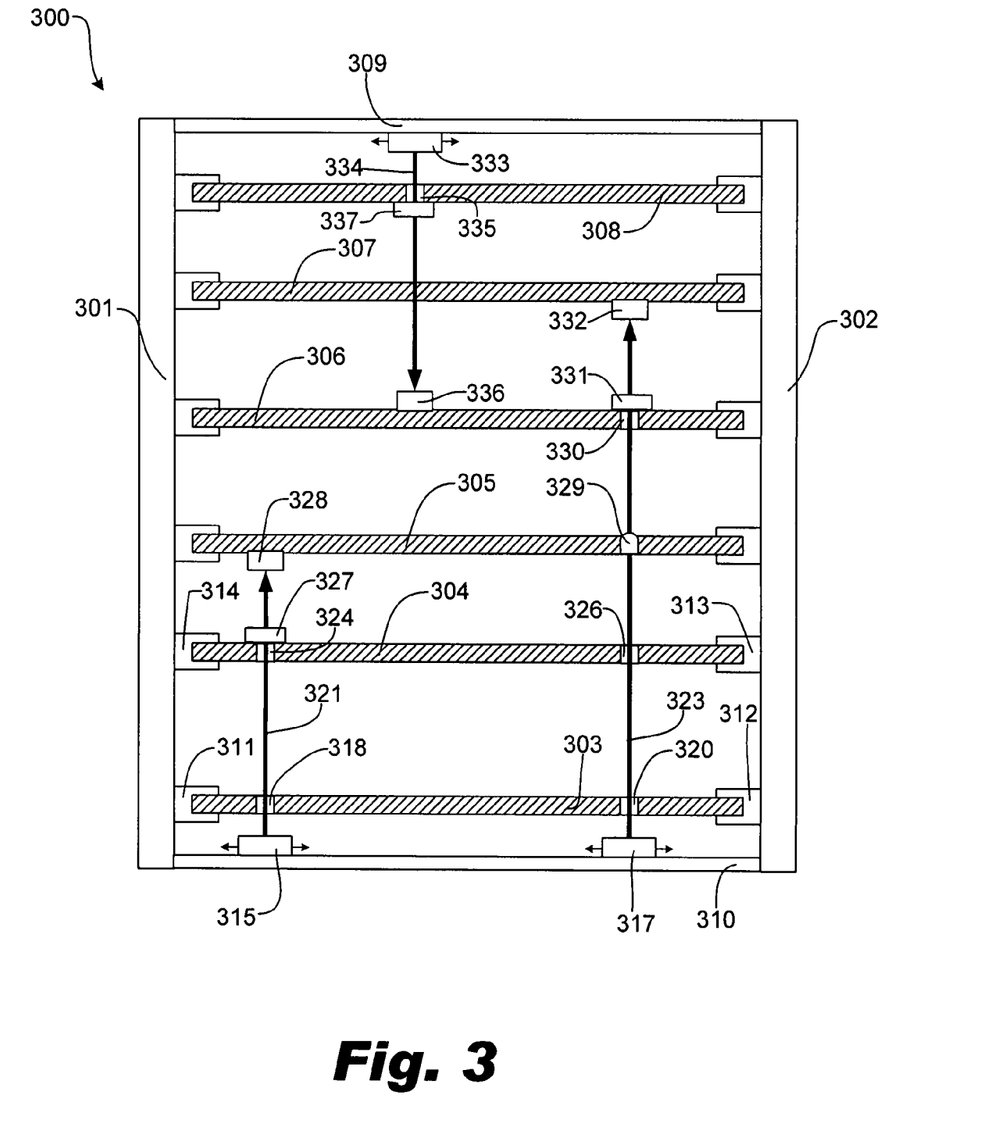
FIG. 3 is a top view of an electronics rack having an exemplary optical interconnect, according to principles described herein.

Referring now to FIG. 3, a cross-sectional side view of another exemplary electronics rack (300) is shown. The exemplary electronics rack (300) has a side panel (309), front and back panels (301, 302) and a second side panel (310), and is configured to house a number of circuit boards, for example, first, second, third, fourth, fifth, and sixth circuit boards (303, 304, 305, 306, 307, 308, respectively).

As explained in previous examples, the circuit boards (303, 304, 305, 306, 307, 308) may each support a variety of electrical components, some of which may require communication with other electrical components on the same or another circuit board in order to perform their desired functions. In the present example, data transmission occurs between the second and third boards (304, 305, respectively), the fourth and fifth boards (306, 307, respectively), and the sixth and fourth boards (308, 306, respectively).

First and second steerable and steerable optical sources (315, 317, respectively) are disposed on the first side panel (310) of the rack (300), while a third steerable optical source (333) is disposed on the second side panel (309) of the rack (300). Each of the optical sources (315, 317, 333) is translatable along its corresponding panel and/or may have an adjustable angle. Each optical source (315, 317, 333) includes an actuator configured to substantially align the optical sources (315, 317, 333) with corresponding selectively transmissive modulator elements (327, 331, 337, respectively), according to the principles of the present specification by translating and/or tilting the optical source.

In the illustrated example, the first optical source (315) is configured to emit an optical beam (321) to a first selectively transmissive or reflective modulator element (327) which encodes data from the second circuit board (304) in the optical beam (321), according to principles of the present specification. The optical beam (321) is transmitted through openings (318, 324) in the first and second circuit boards (303, 304, respectively) to the first selectively transmissive or reflective modulator element (327). The openings (318, 324) are substantially aligned with the first optical source (315) and the first modulator element (327). The modulated optical beam (321) is transmitted from the selectively transmissive or reflective modulator element (327) to a first optical receiver (328) on the third circuit board (305).

The second optical source (317) is configured to emit an optical beam (323) to a second selectively transmissive or reflective modulator element (331) which encodes data from the fourth circuit board (306) in the optical beam (323), according to principles of the present specification. The optical beam (323) is transmitted through openings (320, 326, 329, 330) in the first, second, third, and fourth circuit boards (303, 304, 305, 306, respectively) to the second selectively transmissive or reflective modulator element (331). The openings (320, 326, 329, 330) are substantially aligned with the second optical source (317) and the second modulator element (331). The opening (329) in the third circuit board (305) includes a lens to focus the optical beam (323) onto the second modulator element (331). The modulated optical beam (323) is transmitted or reflected from the selectively transmissive or reflective modulator element (331) to a second optical receiver (332) on the fifth circuit board (307).

The third optical source (333) is configured to emit an optical beam (334) to a third selectively transmissive or reflective modulator element (337) which encodes data from the sixth circuit board (308) in the optical beam (334), according to principles of the present specification. The optical beam (334) is transmitted through an opening (335) in the sixth circuit board (308) to the third selectively transmissive or reflective modulator element (337). The opening (335) is substantially aligned with the third optical source (333) and the third modulator element (337). The modulated optical beam (334) is transmitted or reflected from the selectively transmissive or reflective modulator element (337), through an opening in the fifth circuit board (307) to a third optical receiver (336) in the fourth circuit board (306).

Figure 4:
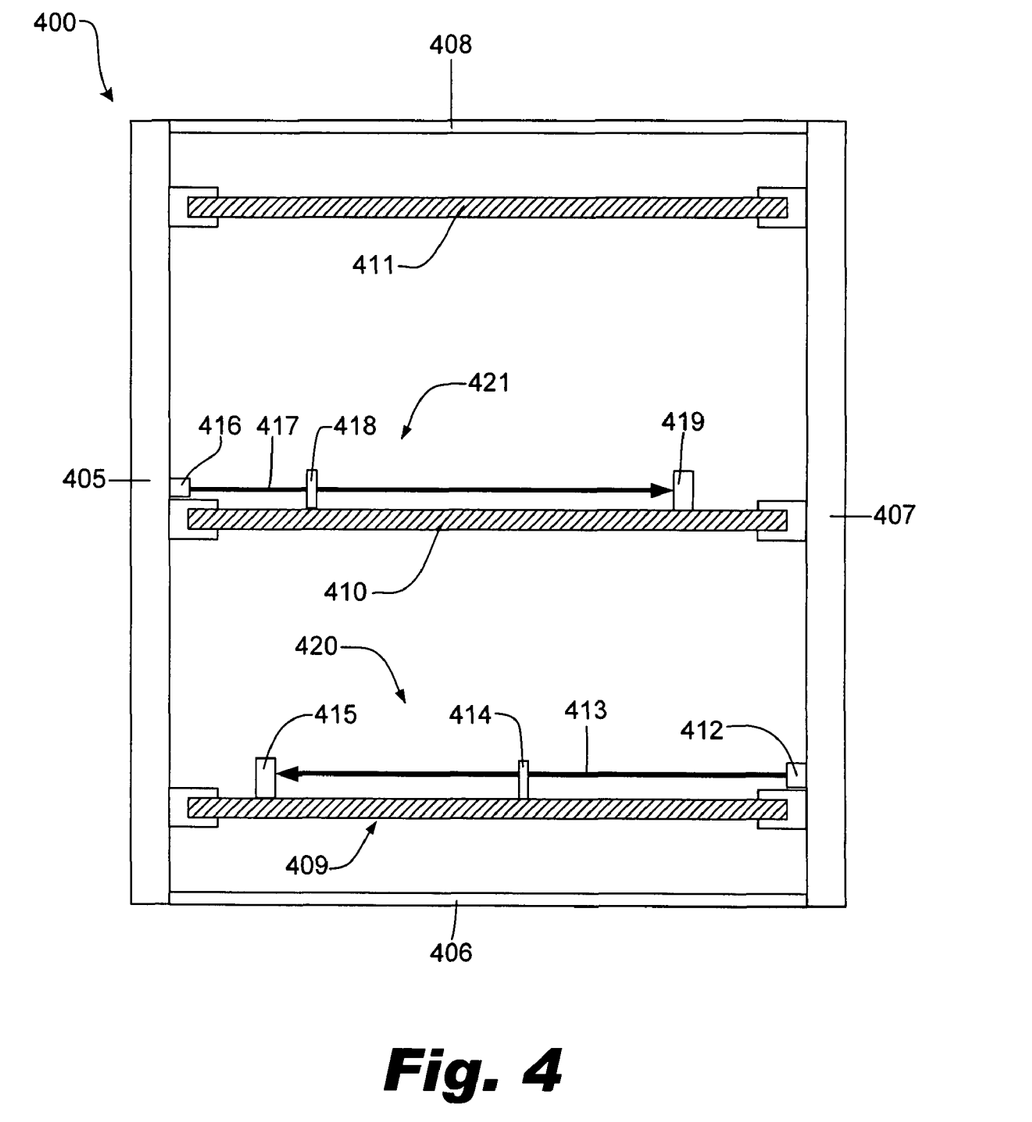
FIG. 4 is a top view of an electronics rack having an exemplary optical interconnect, according to principles described herein.

Referring now to FIG. 4, a cross-sectional view of another exemplary embodiment of an electronics rack (400) is shown. The exemplary rack (400) includes a first side panel (408), front and back panels (405, 407), and a second side panel (406), and is configured to house a number of circuit boards, for example, first, second, and third circuit boards (409, 410, 411, respectively). Both the first and second circuit boards (409, 410, respectively) include exemplary optical interconnect systems (420, 421) for intra-board communications. Optical communications between individual components on the circuit boards (409, 410) may be accomplished at much higher rates, higher bandwidths, and using less power than some conventional intra-board communication methodologies.

In the exemplary optical interconnect system (420) of the first circuit board (409), a first translatable and steerable optical source (412) is disposed on the back panel (407) and configured to emit an optical beam (413) to a first modulator element (414). The optical source (412) is translatable and steerable with respect to the back panel (407) and may include an actuator to substantially align the optical beam (413) with the first modulator element (414). The first modulator element (414) is configured to encode data in the optical beam (413) and direct the modulated optical beam (413) to a first optical receiver (415), which receives the modulated optical beam (413) and decodes the data encoded therein.

In the exemplary optical interconnect system (421) of the second circuit board (410), a second translatable and steerable optical source (416) is disposed on the front panel (405) and configured to emit an optical beam (417) to a second modulator element (418). The optical source (416) is translatable and steerable with respect to the front panel (405) and may include an actuator to substantially align the optical beam (417) with the second modulator element (418). The second modulator element (418) is configured to encode data into the optical beam (417) and direct the modulated optical beam (417) to a second optical receiver (419), which receives the modulated optical beam (417) and decodes the data encoded therein.

Figure 5:
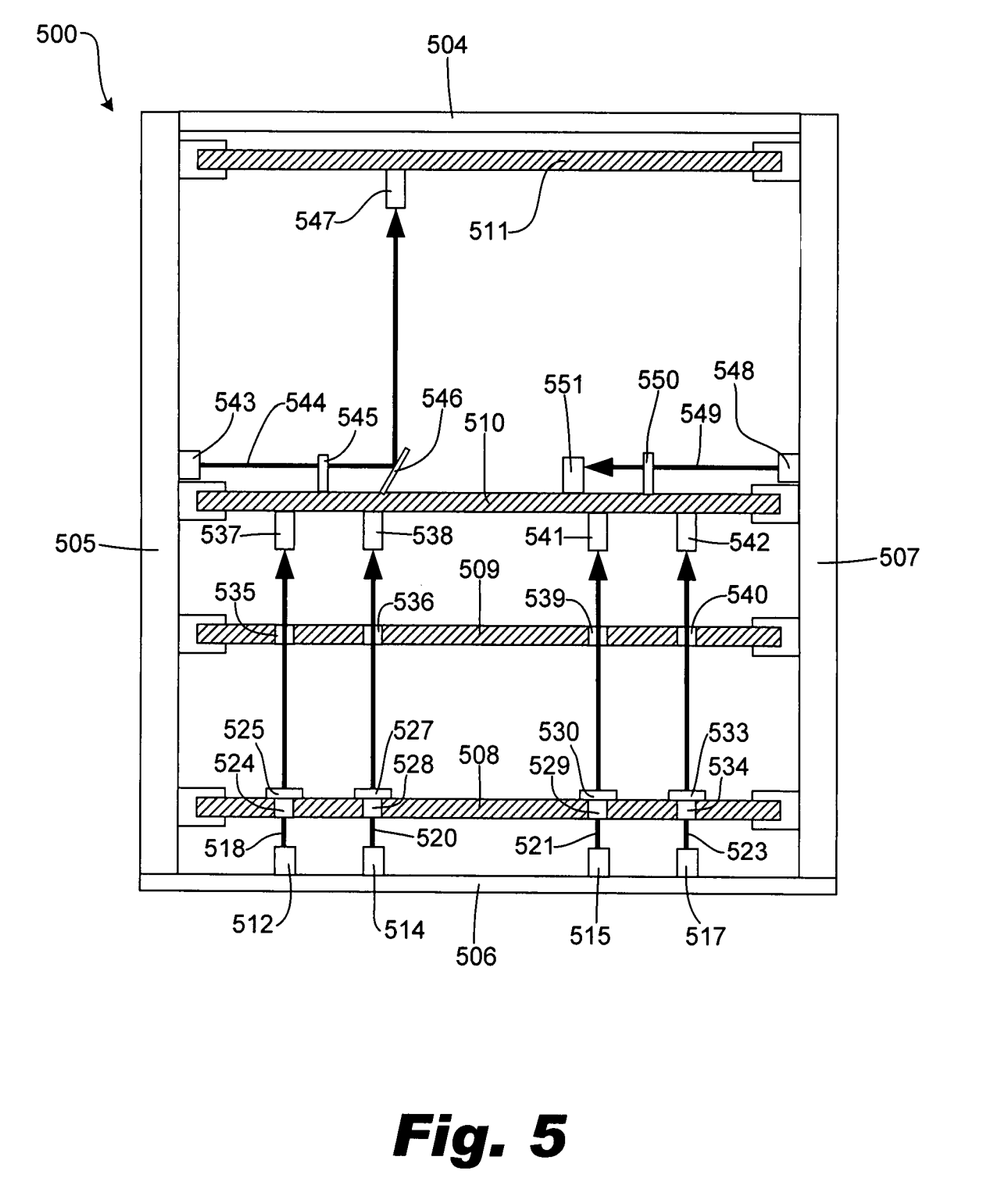
FIG. 5 is a top view of an electronics rack having an exemplary optical interconnect, according to principles described herein.

Referring now to FIG. 5, a cross-sectional top view of another exemplary electronics rack (500) is shown. The exemplary electronics rack (500) has a first side panel (504), front and back panels (505, 507), and a second side panel (506), and is configured to house a number of circuit boards, for example, first, second, third, and fourth circuit boards (508, 509, 510, 511, respectively).

The electronics rack (500) includes optical interconnect systems that allow both inter-board and intra-board data transmission. First, second, third, and fourth translatable and steerable optical sources (512, 514, 515, 517, respectively), according to the principles of the present specification are provided. These optical sources (512, 514, 515, 517) emit corresponding first, second, third, and fourth optical beams (518, 520, 521, 523, respectively) to first, second, third, and fourth selectively transmissive or reflective modulator elements (525, 527, 530, 533, respectively) through first, second, third, and fourth openings (524, 528, 529, 534, respectively) in the first circuit board (508). After being encoded with data by the modulator elements (525, 527, 530, 533), the optical beams (518, 520, 521, 523) are transmitted from the modulator elements (525, 527, 530, 533) to first, second, third, and fourth optical receivers (537, 538, 541, 542, respectively) on the third circuit board (510).

A fifth translatable and steerable optical source (543) consistent with the principles of this specification is disposed on a front panel (505) and configured to transmit an optical beam (544) to a fifth selectively transmissive or reflective modulator element (545). Data is encoded into the optical beam (544) by the fifth modulator element (545), after which the optical beam (544) is reflected or turned by a mirror (546) (or by a reflective modulator) to a fifth optical receiver (547) on the fourth circuit board (511), and demodulated on the fourth circuit board (511).

A sixth translatable optical source (548) consistent with the principles of this specification is disposed on the back panel (507) of the rack (500) and configured to transmit an optical beam (549) to a sixth selectively transmissive or reflective modulator element (550). Once data is encoded onto the optical beam (549) by the sixth modulator element (550), the optical beam (549) is received and demodulated by a sixth optical receiver (551) displaced from the modulator element (550) in the direction indicated by the travel of the optical beam (549).

Figure 6:
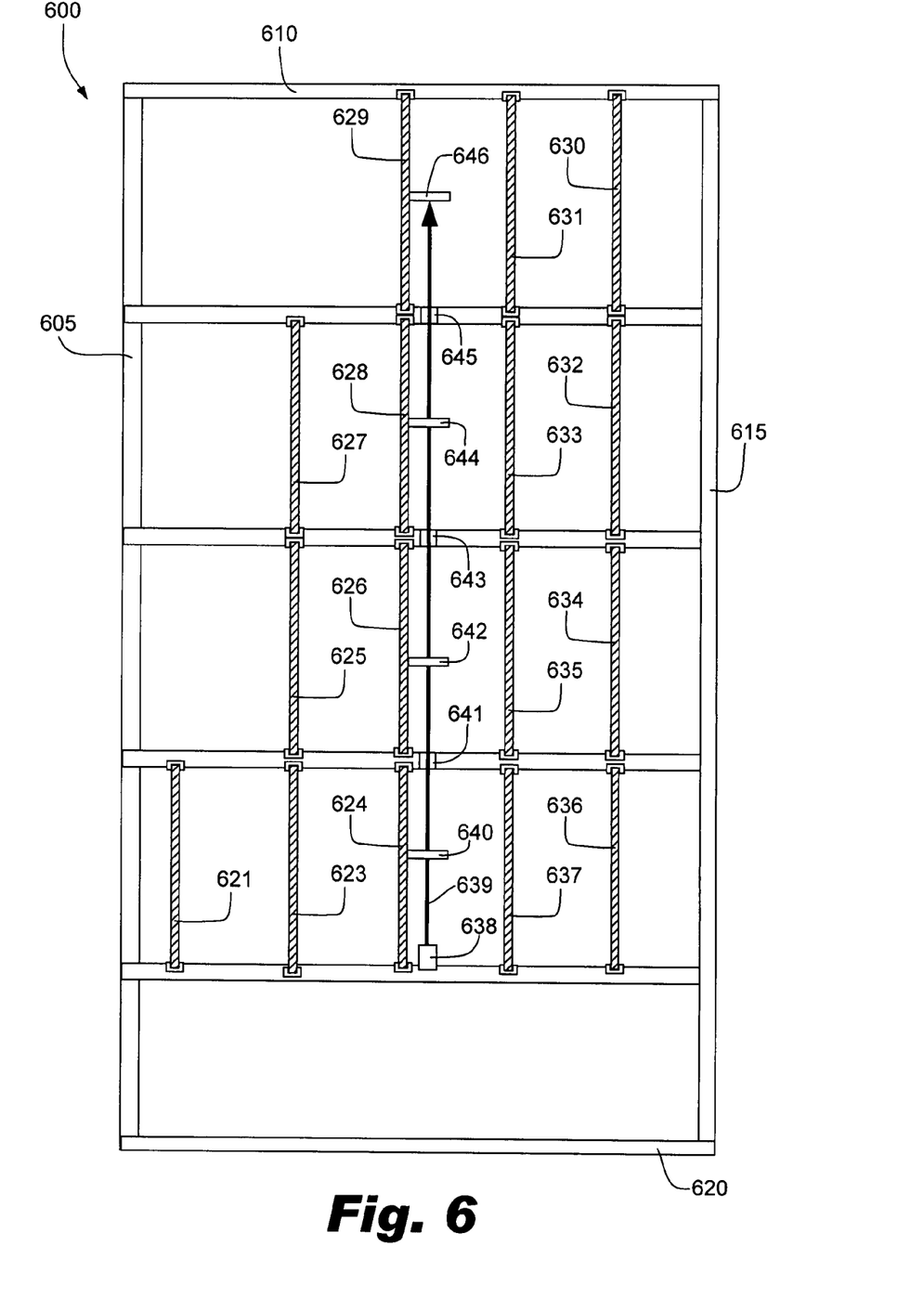
FIG. 6 is a front view of an electronics rack having an exemplary optical interconnect, according to principles described herein.

Referring now to FIG. 6, a front view of another exemplary electronics rack (600) is shown. An exemplary top panel (610), side panels (605, 615), and bottom panel (620) are shown. The exemplary electronics rack (600) is configured to house up to twenty circuit boards that may be slid into or out of four layers in the rack (600). In the present example, the exemplary electronics rack (600) houses sixteen circuit boards (621, 623, 624, 625, 626, 627, 628, 629, 630, 631, 632, 633, 634, 635, 636, 637).

The exemplary electronics rack (600) includes an optical interconnect, according to principles described herein, that enables vertical optical communication among stacked circuit boards (624, 626, 628, 629) on each of the four layers. The optical interconnect includes an optical source (638) configured to emit an optical beam (639). First, second, third, and fourth optical devices (640, 642, 644, 646, respectively) are disposed, respectively, on first, second, third, and fourth circuit boards (624, 626, 628, 629, respectively). The optical devices (640, 642, 644, 646) may be selectively positioned between optical components or corresponding openings (641, 643, 645) in the framework of the rack (600) to selectively modulate data into the optical beam (639) or receive and decode the optical beam (639).

In the present example, the first circuit board (624) is shown transmitting data to the fourth circuit board (629), thus the first optical device (640) is positioned between the optical source (638) and the first opening (641). The first optical device (640) is configured to modulate data from the first circuit board (624) in the optical beam (639). The optical beam is transmitted through the first, second, and third openings (641, 643, 645, respectively) to the fourth optical device (646), which is configured to receive the optical beam (639) and decode the data encoded therein.

In other embodiments, a different combination of the optical devices (640, 642, 644, 646) may be selectively positioned in the path of the optical beam (639) according to data transmission needs.

In the present example, the optical devices (640, 642, 644, 646) may each be reconfigured to function as optical modulators or optical receivers. In this way, greater flexibility in optical communication may be provided as individual circuit boards are replaced or moved to different locations in the rack.

In other embodiments, separate optical modulators and optical receivers may be present on each of the boards (624, 626, 628, 629) and selectively positioned in the path of the optical beam (639) in a similar manner. Furthermore, additional optical interconnects and optical receivers may be employed in accordance with the principles described herein to manipulate the optical beam (639) through three dimensions in an electronics rack (600).

Additionally, in some embodiments, bilateral optical communication may be accomplished by providing separate optical sources on opposing sides of a system of circuit boards having substantially aligned openings. Translatable unilateral or bilateral optical devices may be selectively positioned over the openings according to the direction of data transmission and the circuit board transmitting the data.

Figure 7:
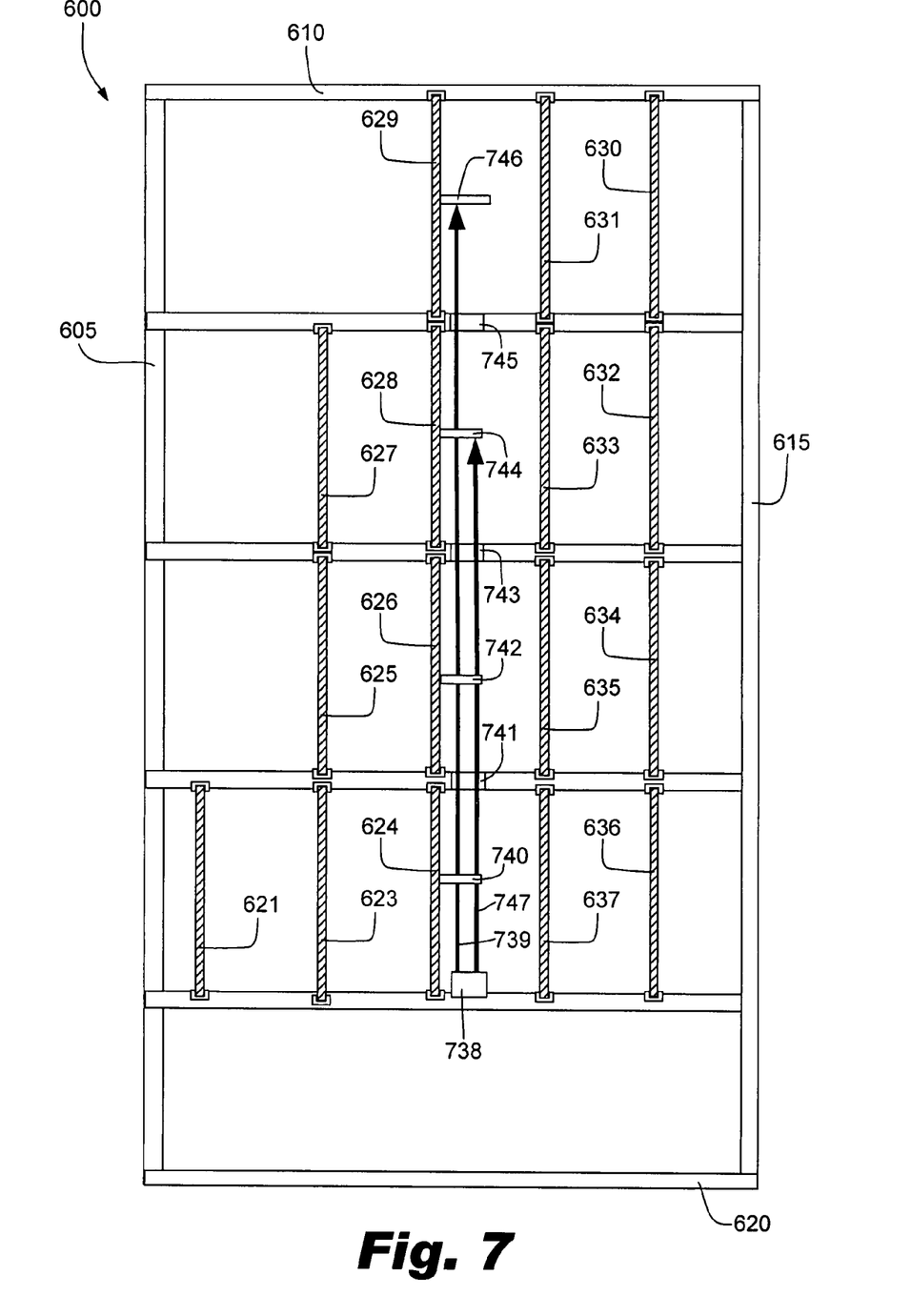
FIG. 7 is a front view of an electronics rack having an exemplary optical interconnect, according to principles described herein.

Referring now to FIG. 7, a front view of another exemplary electronics rack (700) is shown. The exemplary rack (700) is similar to the rack (600, FIG. 6) shown in the previous figure. Consequentially, the exemplary rack (700) includes first, second, third, and fourth optical devices (740, 742, 744, 746, respectively) disposed respectively on first, second, third, and fourth circuit boards (624, 626, 628, 629, respectively).

The optical devices (740, 742, 744, 746) of the present example are configured to selectively pass, modulate, or receive multiple optical beams (739, 747) from the optical source (738). In this way, from a number of optical beams (739, 747), information may be encoded at different boards (624, 626, 628, 629) and be detected at different boards (624, 626, 628, 629). In the present example, a first optical beam (739) is modulated by the first optical device (740) at the first circuit board (624) and transmitted through a first opening (741), the second optical device (742), a second opening (743), a third optical device (744), and the third opening (745) prior to being received and demodulated by the fourth optical device (746) on the fourth circuit board (629).

Likewise, a second optical beam (747) from the optical source (738) is modulated at the first optical device on the first circuit board (624) and transmitted through the first opening (741), the second optical device (742), and the second opening (743). The second optical beam (747) is received and decoded by the third optical device (744) on the third circuit board (628).

As will be appreciated by those skilled in the art, the configurations described herein are merely exemplary. Any number of optical data paths between different circuit boards or circuit board components may be implemented using the principles described herein as best suits a particular application.

Exemplary Methods

Figure 8:
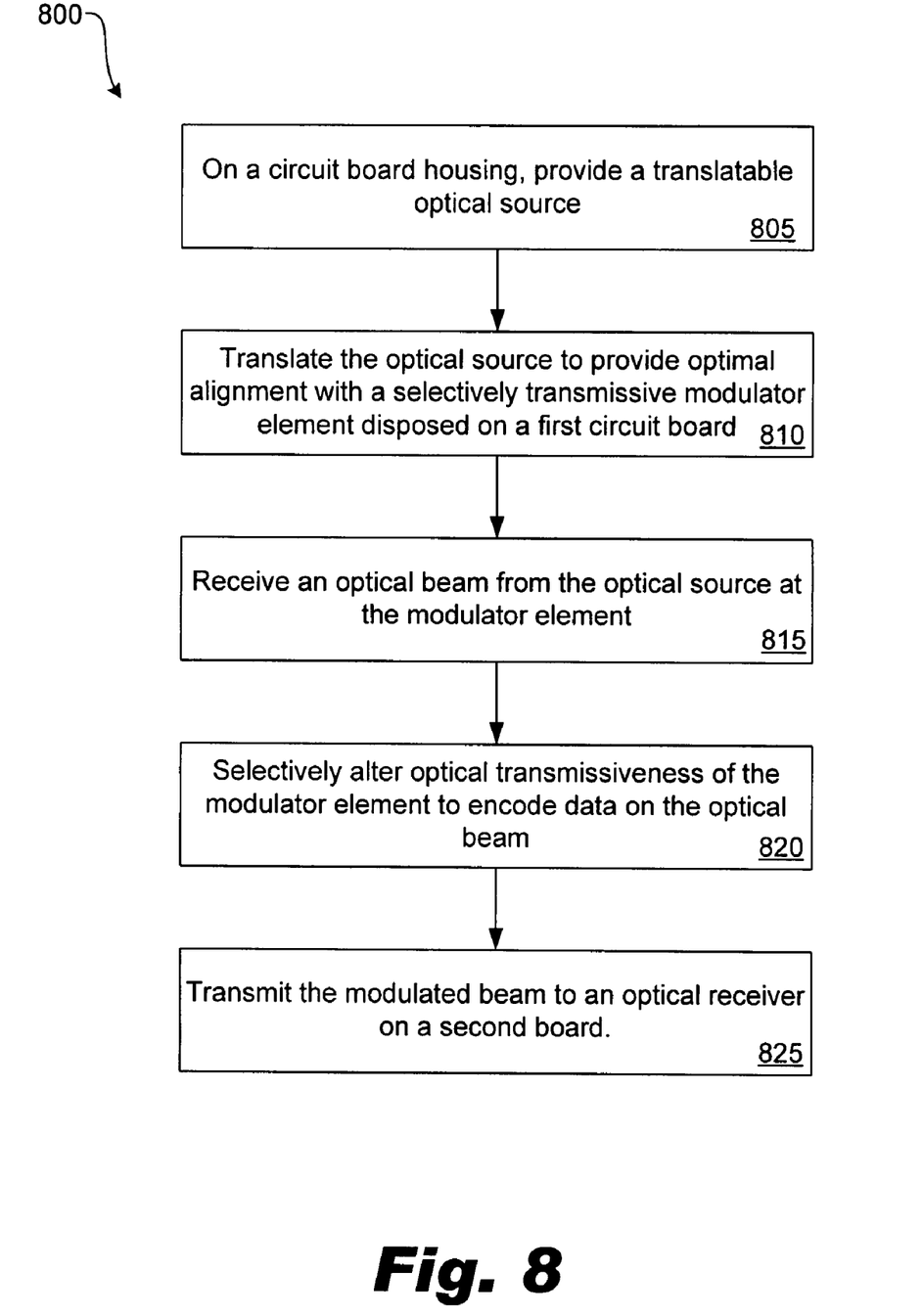
FIG. 8 is a flowchart illustrating an exemplary method of optical interboard communication, according to principles described herein.

Referring now to FIG. 8, a flowchart illustrating an exemplary method (800) of optical inter-board communication consistent with the principles of the present specification is shown. The method (800) includes providing (step 805) a translatable and steerable optical source on a circuit board housing and translating or tilting (step 810) the optical source to provide optical alignment with a selectively transmissive or reflective modulator element disposed on a first circuit board.

An optical beam from the optical source is received (step 815) at the modulator element, and the optical transmissiveness or reflectivity of the modulator element is selectively altered (step 820) to encode data on the optical beam. The modulated optical beam is then transmitted or reflected (step 825) to an optical receiver on a second board. The method (800) may further include demodulating the encoded beam at the optical receiver and outputting from the optical receiver a digital or analog signal representative of the data encoded on the optical beam. In some embodiments, feedback from the optical receiver may be used to determine when the optical source is at the optical alignment with the modulator element. Additionally, in some embodiments, a number of optical beams may be transmitted from a number of optical sources to a number of selectively transmissive or reflective modulator elements, and on to a number of corresponding optical receivers.

Figure 9:
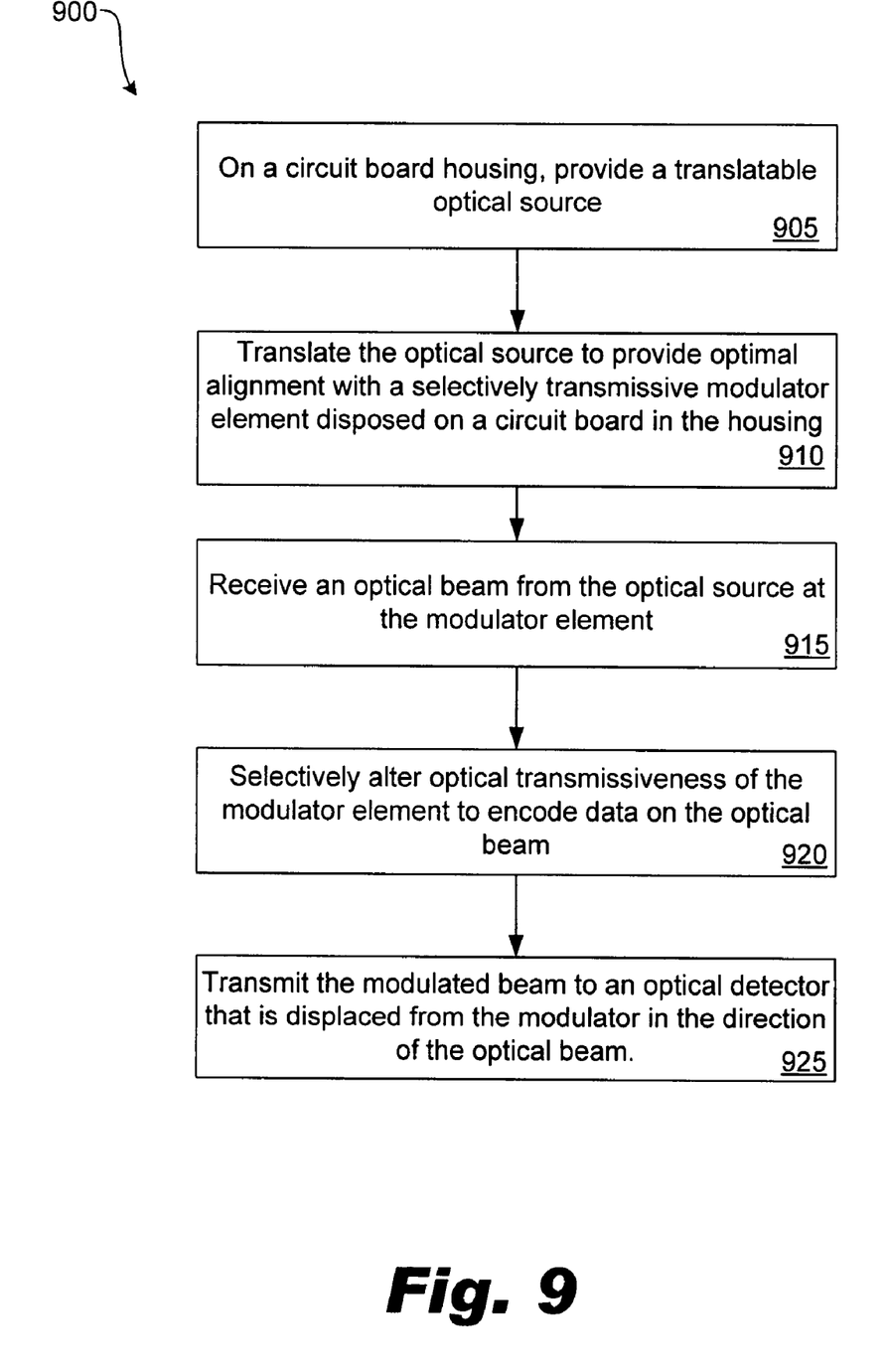
FIG. 9 is a flowchart illustrating an exemplary method of optical intraboard communication, according to principles described herein.

Referring now to FIG. 9, a flowchart illustrating an exemplary method (800) of optical intra-board communication consistent with the principles of the present specification is shown. The method (900) includes providing (step 905) a translatable and steerable optical source on a circuit board housing and translating and/or tilting (910) the optical source to provide optimal alignment with a selectively transmissive or reflective modulator element disposed on a circuit board in the circuit board housing.

An optical beam from the optical source is received (step 915) from the optical source at the modulator element, and the optical transmissiveness or reflectivity of the modulator element is selectively altered (step 920) to encode data on the optical beam. The modulated optical beam is then transmitted to an optical receiver that is displaced from the modulator on the circuit board in the direction of the optical beam. Again, in some embodiments, feedback from the optical receiver may be used to determine when the optical source is at the optical alignment with the modulator element. Furthermore, in some embodiments, a number of optical beams may be transmitted from a number of optical sources to a number of selectively transmissive modulator elements, and on to a number of corresponding optical receivers.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. An optical interconnect, comprising:
a translatable optical source;
an optical modulator element disposed on a circuit board and configured to receive an optical beam from said optical source; and
an optical receiver disposed on a circuit board and configured to receive a modulated optical beam from said modulator element;
wherein said translatable optical source comprises an actuator configured to substantially align said optical source spatially with said modulator element.

2. The optical interconnect of claim 1, wherein said optical modulator element is selected from the group consisting of: selectively transmissive optical devices, selective light blocking optical devices, and combinations thereof.

3. The optical interconnect of claim 1, wherein said optical source is configured to emit a plurality of optical beams directed at a plurality of optical receivers.

4. The optical interconnect of claim 1, wherein said optical modulator is on a first circuit board and said optical receiver is disposed on a second circuit board.

5. The optical interconnect of claim 4, further comprising at least one intermediate circuit board in a path of said optical beam from said optical source to said sensor, said intermediate circuit board comprising an opening to accommodate said path of said optical beam.

6. The optical interconnect of claim 5, wherein said opening comprises a lens.

7. An optical interconnect, comprising:
a translatable optical source;

an optical modulator element disposed on a circuit board and configured to receive an optical beam from said optical source; and an optical receiver disposed on a circuit board and configured to receive a modulated optical beam from said modulator element;

wherein said optical source is steerable and comprises an actuator configured to substantially align said optical source spatially with said modulator element.

8. A device, comprising:

a plurality of circuit boards housed between parallel panels;

at least one translatable optical source disposed on at least one of said panels;

a modulator element disposed on at least one of said circuit boards and configured to receive an optical beam from said optical source; and an optical receiver disposed on at least one of said circuit boards and configured to receive a modulated optical beam from said modulator element;

wherein said translatable optical source further comprises a steerable optical source comprising an actuator configured to spatially align said optical beam with said optical modulator element.

9. The device of claim 8, wherein said modulator element is selected from the group consisting of: selectively transmissive optical modulator elements, selectively reflective optical modulator elements, and combinations thereof.

10. The device of claim 8, wherein said modulator element and optical receiver are disposed on a same circuit board.

11. The device of claim 8, wherein said optical source is configured to transmit said optical beam through a path selected from the group consisting of: openings in intermediate circuit boards, outer edges of intermediate circuit boards, and combinations thereof.

12. The device of claim 8, wherein said optical source is configured to emit a plurality of optical beams directed at a plurality of optical receivers.

13. A method of optical communication, said method comprising, with an electronic actuator, moving an optical source so as to align a light beam from said optical source with a modulator element disposed on a circuit board, wherein said modulator element selectively transmits said light beam to an optically coupled optical receiver so as to encode data in said light beam that is received and decoded by said optical receiver.

14. The method of claim 13, further comprises steering said optical source by adjusting an angle of said optical source to achieve an optimal spatial alignment with said modulator element and said optical receiver.

15. The method of claim 14, further comprising using feedback from said optical receiver to determine when said optical source is at said optimal spatial alignment.

16. The method of claim 13, further comprising disposing said modulator element and said optical receiver on different circuit boards.

17. The method of claim 13, further comprising disposing said modulator element and said optical receiver on a common circuit board.

18. The method of claim 13, further comprising modulating different parts of said light beam with different modulator elements.

* * * * *